United States Patent
Robin et al.

(10) Patent No.: US 10,884,434 B2
(45) Date of Patent: *Jan. 5, 2021

(54) METHOD AND DEVICE FOR CONTROLLING THE PATH OF A FOLLOWING AIRCRAFT, WITH RESPECT TO A LEADING AIRCRAFT, IN FRONT OF THE FOLLOWING AIRCRAFT, IN PARTICULAR WHEN THERE IS A RISK OF COLLISION, THE LEADING AND FOLLOWING AIRCRAFT FLYING IN FORMATION

(71) Applicant: Airbus Operations (S.A.S.), Toulouse (FR)

(72) Inventors: Jean-Luc Robin, Saint-Jean (FR); José Torralba, Merville (FR); Julie Lebas, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 297 days.

This patent is subject to a terminal disclaimer.

(21) Appl. No.: 16/051,216

(22) Filed: Jul. 31, 2018

(65) Prior Publication Data
US 2019/0041876 A1    Feb. 7, 2019

(30) Foreign Application Priority Data

Aug. 3, 2017    (FR) ...................................... 17 57452

(51) Int. Cl.
*G08G 5/04*    (2006.01)
*G05G 1/10*    (2006.01)
(Continued)

(52) U.S. Cl.
CPC ........... *G05D 1/104* (2013.01); *G08G 5/0008* (2013.01); *G08G 5/0021* (2013.01);
(Continued)

(58) Field of Classification Search
None
See application file for complete search history.

(56) References Cited

U.S. PATENT DOCUMENTS 6,271,768 B1    8/2001  Frazier, Jr. et al.
6,459,411 B2   10/2002  Frazier et al.
(Continued)

FOREIGN PATENT DOCUMENTS

DE    102016103704 A1    9/2017
EP          1147506 B1    9/2003
(Continued)

OTHER PUBLICATIONS

French Search Report for French Application No. 1757453 dated Aug. 3, 2017.

(Continued)

*Primary Examiner* — Peter D Nolan
*Assistant Examiner* — Demetra R Smith-Stewart
(74) *Attorney, Agent, or Firm* — Jenkins. Wilson. Taylor & Hunt P.A.

(57) ABSTRACT

Method and device for controlling the path of a following aircraft with respect to a leading aircraft where the aircraft fly in formation. The device includes a data reception unit configured to receive an item of risk of collision information relating to the leading aircraft, a calculating unit configured to determine at least one what is termed safety position when an item of risk of collision information is received, the safety position corresponding to a position in which the following aircraft is not subjected to effects of vortices generated by the leading aircraft, and a control unit configured to bring the following aircraft into the safety position as soon as the calculating unit has determined the safety position.

13 Claims, 3 Drawing Sheets

(51) Int. Cl.
  *B64C 23/06* (2006.01)
  *G05D 1/10* (2006.01)
  *G08G 5/00* (2006.01)

(52) U.S. Cl.
  CPC ......... *G08G 5/0052* (2013.01); *G08G 5/0078* (2013.01); *G08G 5/0091* (2013.01); *G08G 5/045* (2013.01); *B64C 23/06* (2013.01)

(56) References Cited

U.S. PATENT DOCUMENTS

| | | | |
|---|---|---|---|
| 6,483,454 | B1 | 11/2002 | Torre et al. |
| 6,683,541 | B2 | 1/2004 | Staggs et al. |
| 6,703,945 | B2 | 3/2004 | Kuntman et al. |
| 6,718,236 | B1 | 4/2004 | Hammer et al. |
| 6,963,291 | B2 | 11/2005 | Holforty et al. |
| 7,411,519 | B1 | 8/2008 | Kuntman et al. |
| 8,135,500 | B1 | 3/2012 | Robinson |
| 8,229,604 | B2 | 7/2012 | Villaume et al. |
| 8,362,925 | B2 | 1/2013 | Brinkman et al. |
| 8,447,443 | B1 | 5/2013 | Ryan et al. |
| 8,949,090 | B2 | 2/2015 | Whitehead et al. |
| 9,536,435 | B1 | 1/2017 | Shay |
| 10,170,009 | B2 | 1/2019 | Hiale-Guilhamou et al. |
| 10,347,143 | B2 | 7/2019 | Robin et al. |
| 10,380,903 | B2 | 8/2019 | Robin et al. |
| 2002/0011950 | A1 | 1/2002 | Frazier et al. |
| 2002/0063653 | A1 | 5/2002 | Oey et al. |
| 2002/0075171 | A1 | 6/2002 | Kuntman et al. |
| 2002/0080059 | A1 | 6/2002 | Tran |
| 2002/0089432 | A1 | 7/2002 | Staggs et al. |
| 2002/0154061 | A1 | 10/2002 | Frazier et al. |
| 2003/0137444 | A1 | 7/2003 | Stone et al. |
| 2003/0222795 | A1 | 12/2003 | Holforty et al. |
| 2003/0236623 | A1 | 12/2003 | Ybarra et al. |
| 2005/0055143 | A1 | 3/2005 | Doane |
| 2005/0156777 | A1 | 7/2005 | King et al. |
| 2005/0230563 | A1 | 10/2005 | Corcoran, III |
| 2007/0103340 | A1 | 5/2007 | Baranov |
| 2007/0132638 | A1 | 6/2007 | Frazier et al. |
| 2007/0268175 | A1 | 11/2007 | Rowlan |
| 2007/0299611 | A1 | 12/2007 | Winkler et al. |
| 2008/0103647 | A1 | 5/2008 | Lucas et al. |
| 2009/0088972 | A1 | 4/2009 | Bushnell |
| 2010/0001882 | A1 | 1/2010 | Jeddi |
| 2010/0117892 | A1 | 5/2010 | Barbaresco |
| 2010/0292871 | A1 | 11/2010 | Schultz et al. |
| 2010/0294890 | A1 | 11/2010 | Journade |
| 2011/0137498 | A1 | 6/2011 | Suzuki |
| 2011/0282582 | A1 | 11/2011 | Stayton et al. |
| 2012/0209457 | A1 | 8/2012 | Bushnell |
| 2013/0261949 | A1 | 10/2013 | Eriksson |
| 2014/0136110 | A1 | 5/2014 | Nykl et al. |
| 2014/0214243 | A1 | 7/2014 | Whitehead et al. |
| 2015/0025797 | A1 | 1/2015 | Hardesty et al. |
| 2015/0235559 | A1 | 8/2015 | Alekseev et al. |
| 2016/0093224 | A1 | 3/2016 | Pereira |
| 2016/0272340 | A1 | 9/2016 | Leland |
| 2017/0110018 | A1 | 4/2017 | Wang et al. |
| 2017/0178516 | A1 | 6/2017 | Shenfeld et al. |
| 2017/0267371 | A1 | 9/2017 | Frolov et al. |
| 2017/0301251 | A1* | 10/2017 | Robin ................ G08G 5/0008 |
| 2017/0309192 | A1* | 10/2017 | Robin ................ G08G 5/0021 |
| 2017/0315564 | A1 | 11/2017 | Thomas et al. |
| 2017/0337822 | A1 | 11/2017 | Reinke et al. |
| 2018/0301044 | A1 | 10/2018 | Hiale-Guilhamou et al. |
| 2018/0308369 | A1 | 10/2018 | Robin |
| 2018/0348796 | A1* | 12/2018 | Torralba ............... G05D 1/0825 |
| 2019/0041874 | A1 | 2/2019 | Robin et al. |
| 2019/0041875 | A1 | 2/2019 | Torralba et al. |
| 2019/0302808 | A1 | 10/2019 | Robin et al. |
| 2019/0310642 | A1 | 10/2019 | Robin et al. |

FOREIGN PATENT DOCUMENTS

| | | |
|---|---|---|
| EP | 2187371 A1 | 5/2010 |
| EP | 1464037 B1 | 7/2010 |
| EP | 2256517 A1 | 12/2010 |
| EP | 2693417 A2 | 2/2014 |
| EP | 2772817 A2 | 9/2014 |
| EP | 2851889 A2 | 3/2015 |
| EP | 2892000 A1 | 7/2015 |
| FR | 3041121 A1 | 3/2017 |
| FR | 3 049 076 A1 | 9/2017 |
| WO | WO 2004/029902 A1 | 4/2004 |
| WO | WO 2016/067019 A1 | 5/2016 |
| WO | WO 2017/161304 A1 | 9/2017 |

OTHER PUBLICATIONS

French Search Report for Frech Application No. 1757446 dated Apr. 24, 2018.
French Search Report for French Application No. 1757452 dated May 9, 2018.
Pre-interview First Office Action for U.S. Appl. No. 16/051,057 dated Apr. 30, 2020.
French Search Report for Application No. 1651927 dated Dec. 8, 2016.
French Search Report for Application No. 1653444 dated Dec. 9, 2016.
French Search Report for Application No. 1753139 dated Oct. 24, 2017.
Notice of Allowance for U.S. Appl. No. 15/950,111 dated Aug. 30, 2018.
First Action Interview Pilot Program Pre-Interview Communication for U.S. Appl. No. 15/491,771 dated Sep. 6, 2018.
European Search Report for Application No. 18161829.9 dated Sep. 11, 2018.
European Office Action for Applicaton No. 18161829.9 dated Sep. 24, 2018.
First Action Interview Pilot Program Pre-Interview Communication for U.S. Appl. No. 15/445,506 dated Oct. 2, 2018.
Frech Search Report for Application No. 1852909 dated Oct. 22, 2018.
French Search Report for Application No. 1852633 dated Nov. 22, 2018.
First Action Interview Office Action Summary and Interview Summary for U.S. Appl. No. 15/445,506 dated Dec. 4, 2018.
First Action Interview Office Summary and Interview Summary for U.S. Appl. No. 15/491,771 dated Dec. 4, 2018.
European Search Report for Application No. 18182475.6 dated Jan. 3, 2019.
European Office Action for Application No. 18182475.6 dated Jan. 16, 2019.
Notice of Allowance for U.S. Appl. No. 15/491,771 dated Feb. 27, 2019.
Notice of Allowance for U.S. Appl. No. 15/445,506 dated Apr. 9, 2019.
Pre-Interview First Office Action for U.S. Appl. No. 16/051,143 dated Jul. 7, 2020.

* cited by examiner

METHOD AND DEVICE FOR CONTROLLING THE PATH OF A FOLLOWING AIRCRAFT, WITH RESPECT TO A LEADING AIRCRAFT, IN FRONT OF THE FOLLOWING AIRCRAFT, IN PARTICULAR WHEN THERE IS A RISK OF COLLISION, THE LEADING AND FOLLOWING AIRCRAFT FLYING IN FORMATION

CROSS-REFERENCE TO RELATED APPLICATION

This application claims the benefit of and priority to French patent application number 1757452 filed on Aug. 3, 2017, the entire disclosure of which is incorporated by reference herein.

TECHNICAL FIELD

The disclosure herein relates to a method and to a device for controlling the path of an aircraft, termed following aircraft, with respect to an aircraft, termed leading aircraft, in front of the following aircraft, in particular when there is a risk of collision, the leading and following aircraft flying in formation.

BACKGROUND

A formation flight comprises at least two aircraft, in particular transport planes, namely a leading aircraft (or leader), and one or more following aircraft. The following aircraft fly following the aircraft that they are directly following (namely the leading aircraft or another following aircraft) in such a way as to maintain a constant spacing between them. In one particular application, in particular when cruising, the aircraft fly behind one another at the same flight level, with the same heading and the same speed. There may also be provision to apply speed control orders to the following aircraft, which orders are such that they allow the following aircraft to have the same position, the same speed and the same acceleration as the leading aircraft had at given past periods.

Moreover, aircraft, in particular airliners, are equipped with TCAS (for 'traffic collision avoidance system') collision avoidance systems that make it possible to ensure the safety of air traffic by warning of in-flight collision risks.

Thus, when the collision avoidance system of the leading aircraft detects a risk of collision with an aircraft in the surroundings external to the formation or with the following aircraft that is following it in the formation, it generally transmits an alert and it executes an avoidance maneuver so as to exit the possibility (or risk) of collision situation. Such an avoidance maneuver generally consists in performing a vertical separation between the aircraft in question, generally of 700 feet for airliners.

Now, such an avoidance maneuver, which generates a change in altitude for at least one of the aircraft in the formation, may lead to a following aircraft having to pass through a wake vortex that is created downstream of the leading aircraft in front of the following aircraft.

This potential passing through a wake vortex may create disturbances for the following aircraft, which may generate negative effects in the cabin of the latter.

Such conventional management of an avoidance maneuver for a formation flight, when there is a risk of collision, is therefore not satisfactory.

SUMMARY

An aim of the disclosure herein is to rectify this drawback. It relates to a method for controlling the path of an aircraft, termed following aircraft, with respect to an aircraft, termed leading aircraft, in front of the following aircraft, in the event of a risk of collision, the leading and following aircraft flying in formation.

According to the disclosure herein, the method comprises a sequence of steps, implemented on the following aircraft and comprising at least:

a reception step, implemented by a data reception unit and comprising or consisting of receiving at least one item of risk of collision information relating to the leading aircraft;

a calculation step, implemented by a calculating unit and comprising or consisting of determining at least one what is termed safety position when an item of risk of collision information is received, the safety position corresponding to a position in which the following aircraft is not subjected to effects of vortices generated by the leading aircraft; and a control step, implemented by a control unit and comprising or consisting of bringing the following aircraft into the safety position.

Thus, by virtue of the disclosure herein, as soon as an item of risk of collision information for the leading aircraft is transmitted and a conventional avoidance maneuver is executed in principle by the latter, it is possible to bring the following aircraft into a safety position (without a vortex) before the potentially hazardous movement of the vortices that are generated by the avoidance maneuver of the leading aircraft produces effects on the following aircraft.

In the context of the disclosure herein, the risk of collision for the leading aircraft may relate to a risk of collision with the following aircraft or else with another aircraft in the surroundings external (or not external) to the formation.

Advantageously, the reception step comprises or consists of receiving an item of risk of collision information coming from a collision avoidance system of the leading aircraft. Thus, even in the event of failure of the collision avoidance system of the following aircraft, the latter is warned of the risk of collision. Therefore, in addition to allowing the following aircraft to be brought into the safety position, it is possible to detect a failure of the collision avoidance system of the following aircraft.

As a variant or in addition, the reception step advantageously comprises or consists of receiving an item of risk of collision information coming from a collision avoidance system of the following aircraft.

Furthermore, the calculation step advantageously comprises or consists of determining, as safety position, a position spaced apart at least laterally with respect to at least one anticipated path, followed by the leading aircraft during an avoidance maneuver and intended to eliminate the risk of collision, and in which safety position the following aircraft is not subjected to effects of the vortices generated by the leading aircraft.

Moreover, prior to the reception of an item of risk of collision information, the control step advantageously comprises or consists of keeping the following aircraft in what is termed an optimum position, in which the following aircraft flying in formation benefits from effects of at least one of the vortices generated by the leading aircraft.

Moreover, the control step comprises or consists of, by bringing the following aircraft into the safety position:

in a first embodiment, maintaining the formation flight; and in a second embodiment, breaking the formation flight.

The disclosure herein also relates to a device for controlling the path of an aircraft, termed following aircraft, with respect to an aircraft, termed leading aircraft, in front of the following aircraft, in the event of a risk of collision, the leading and following aircraft flying in formation.

According to the disclosure herein, the control device includes, installed on the following aircraft:
- a data reception unit configured to receive at least one item of risk of collision information relating to the leading aircraft;
- a calculating unit configured to determine at least one what is termed safety position when an item of risk of collision information is received, the safety position corresponding to a position in which the following aircraft is not subjected to effects of vortices generated by the leading aircraft; and
- a control unit configured to bring the following aircraft into the safety position, as soon as the calculating unit has determined the safety position.

In a first embodiment, the data reception unit is configured to receive an item of risk of collision information coming from a collision avoidance system of the leading aircraft.

Furthermore, as a variant or in addition, in a second embodiment, the data reception unit is configured to receive an item of risk of collision information coming from a collision avoidance system of the following aircraft.

The disclosure herein moreover relates to an aircraft, in particular a transport plane, which is equipped with a path control device such as the one described above.

BRIEF DESCRIPTION OF THE DRAWINGS

The appended, example figures will make it easy to understand how the disclosure herein may be embodied. In these figures, identical references denote similar elements. More particularly.

DETAILED DESCRIPTION

Figure 1:
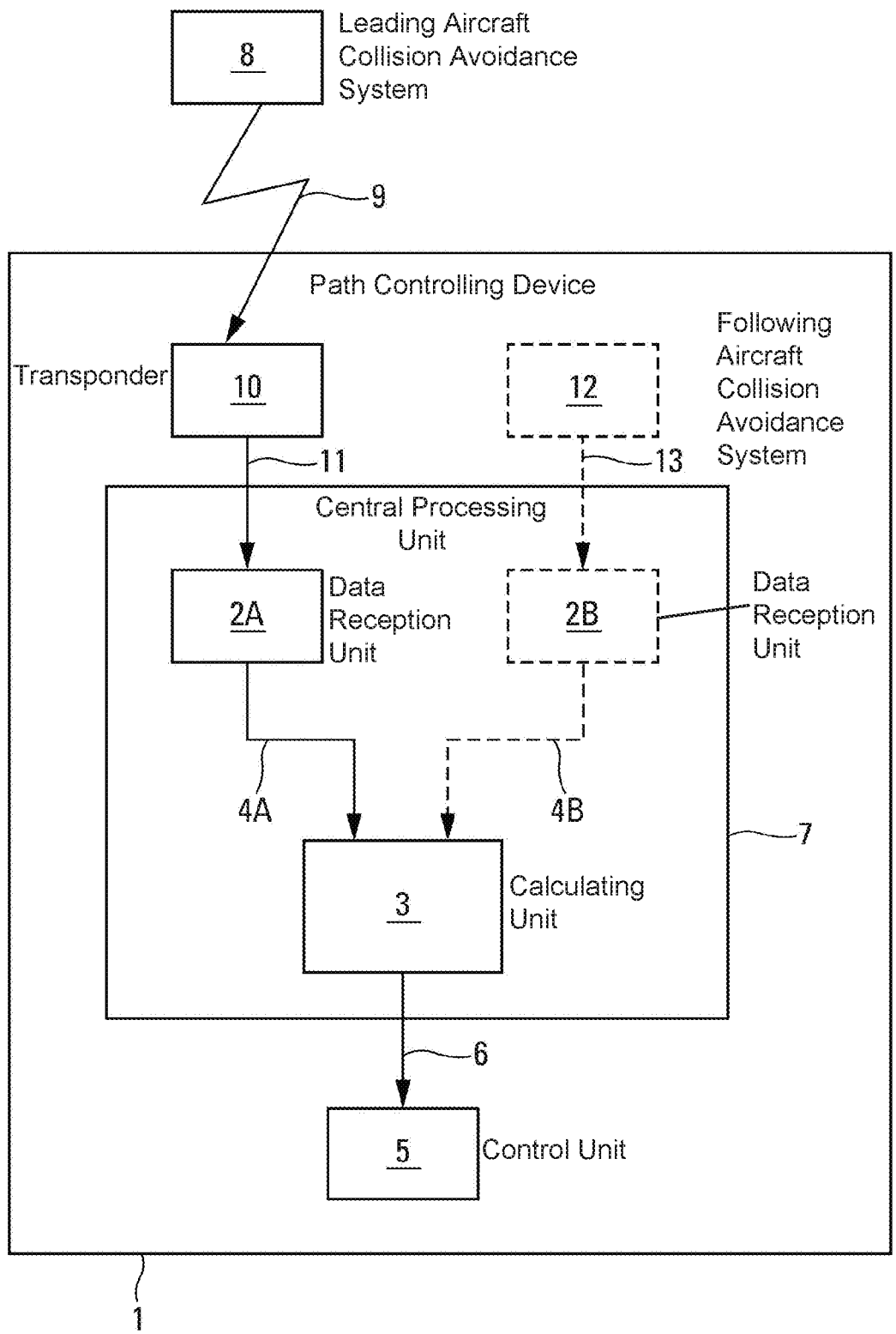
FIG. 1 is a schematic overview of a first embodiment of a control device according to the disclosure herein.
Figure 2:
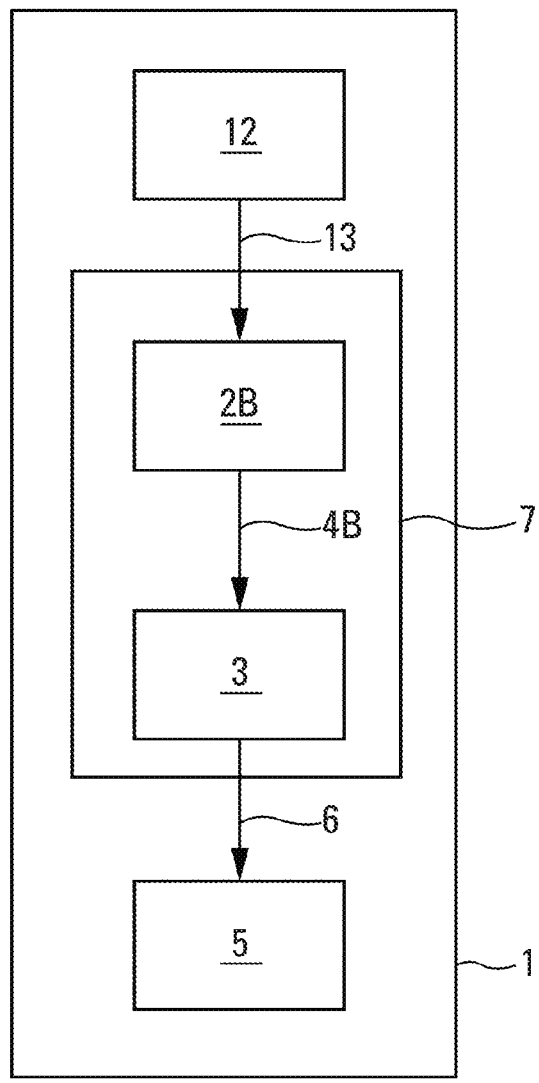
FIG. 2 is a schematic overview of a second embodiment of a control device according to the disclosure herein.
Figure 3:
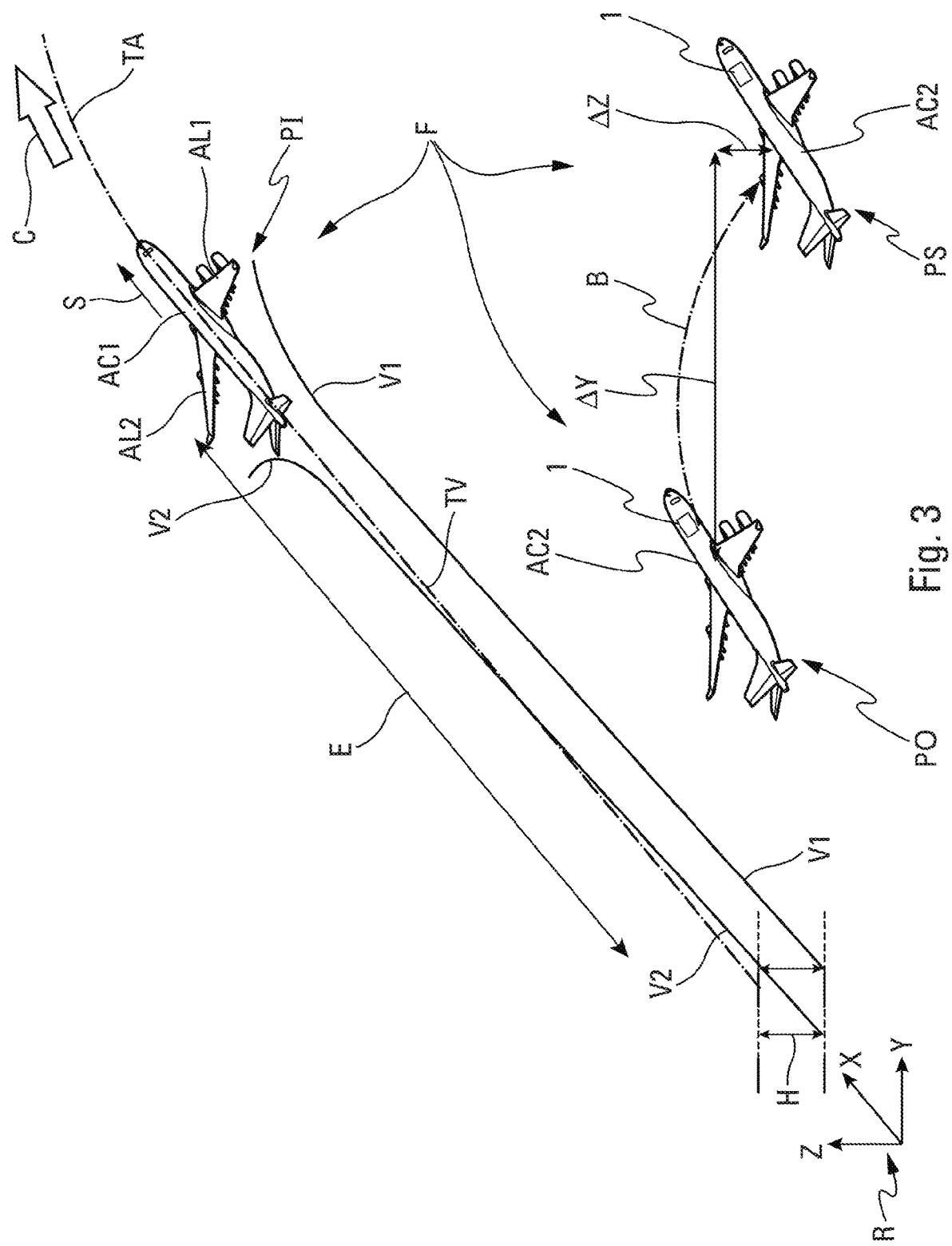
FIG. 3 is a schematic depiction of a formation flight, showing a leading aircraft generating vortices and two possible positions for a following aircraft with respect to these vortices.

The device 1 that makes it possible to illustrate the disclosure herein and that is shown schematically in FIGS. 1 and 2 in two different embodiments is a device for controlling the path of a following aircraft AC2, with respect to a leading aircraft AC1 in front of the following aircraft, as illustrated in FIG. 3. The leading and following aircraft, for example two transport planes, are flying in formation F. The device 1 is installed on the following aircraft AC2, as shown highly schematically in FIG. 3.

As is conventional, the formation F comprises the leading aircraft AC1 and one or more following aircraft, namely a single following aircraft AC2 in the example of FIG. 3, which follow(s) the leading aircraft AC1 (situated at a position PI) in such a way as to keep a constant longitudinal spacing E between them. In one particular application, in particular when cruising, the aircraft AC1 and AC2 fly behind one another at the same flight level, with the same heading and the same speed.

Furthermore, in one preferred mode of implementation, the following aircraft AC2 is slightly laterally offset with respect to the path TV followed by the leading aircraft AC1, and it is situated in what is termed an optimum position PO for benefiting from the effects of vortices V1, V2 generated by the leading aircraft AC1, as explained below.

To facilitate the description, FIG. 3 shows an orthonormal reference frame R, formed from three axes (or directions) X, Y and Z that are orthogonal to one another, which are such that:
- X is the longitudinal axis of the fuselage of the leading aircraft AC1 oriented positively in the direction of travel S of the leading aircraft AC1;
- Z is a vertical axis that forms, with the X-axis, a plane corresponding to the vertical plane of symmetry of the leading aircraft AC1; and
- Y is a lateral axis that is orthogonal to the X- and Z-axes.

In one particular embodiment, the device 1 forms part of a formation flight management unit (not shown specifically) that is on board the following aircraft AC2. Such a unit is configured to manage the formation flight at least for the following aircraft AC2.

According to the disclosure herein, the device 1 includes, as shown in FIGS. 1 and 2:
- a data reception unit 2A, 2B configured to receive an item of risk of collision information, explained below, relating to the leading aircraft AC1;
- a calculating unit 3 configured to determine at least one what is termed safety position PS, as soon as an item of risk of collision information is received (via a link 4A, 4B). The safety position PS corresponds to a position in which the following aircraft AC2 is not subjected to effects of the vortices V1, V2 generated by the leading aircraft AC1, as shown in FIG. 3 and explained below; and
- a control unit 5 configured to bring the following aircraft AC2 into the safety position PS (and keep it there), as soon as an item of risk of collision information is received and the safety position PS has been calculated by the calculating unit 3 (and transmitted by way of a link 6 to the control unit 5).

In one particular embodiment, the reception unit 2A, 2B and the calculating unit 3 are integrated into one and the same central processing unit 7.

Moreover, the control unit 5 comprises all of the usual means necessary to manually or automatically pilot the following aircraft AC2. This control unit 5 is not described further in the following description.

Thus, the device 1 makes it possible, as soon as an item of risk of collision information (explained below) for the leading aircraft AC1 is transmitted and in particular an avoidance maneuver is executed conventionally by the latter, to bring the following aircraft AC2 into a safety position PS (without a vortex) before the potentially hazardous movement of the vortices that are generated by the avoidance maneuver of the leading aircraft AC1 produces effects (generally a few seconds later) on the following aircraft AC2.

The device 1 thus makes it possible to anticipate an avoidance maneuver of the leading aircraft AC1 in order to bring the following aircraft AC2, through an anticipated order and movement of the latter, outside of the zone of the vortices before the effect of the vortices generated by the avoidance maneuver reaches the longitudinal position (along the longitudinal axis X) of the following aircraft AC2.

In a first embodiment (shown in an unbroken line in FIG. 1), the data reception unit 2A is configured to receive an item of risk of collision information generated by a collision avoidance system 8 of the leading aircraft AC1.

In this first embodiment, the risk of collision (taken into account by the device 1) that relates to the leading aircraft AC1 may relate to a risk of collision of the leading aircraft AC1 with the following aircraft AC2, or else a risk of collision of the leading aircraft AC1 with another aircraft (not shown) in the surroundings of the leading aircraft AC1, which surroundings are external (or not external) to the formation F.

Preferably, the collision avoidance system 8 is a TCAS (for 'traffic collision avoidance system'). This collision avoidance system 8 makes it possible, as is conventional, to ensure the safety of air traffic by warning of in-flight collision risks. Thus, when two aircraft converge towards one another, the collision avoidance system installed on one of these aircraft calculates an estimation of the collision time and transmits an alert informing the crew of a possible future collision: such an alert is generally called 'traffic advisory' or 'TA alert'. Where necessary, the collision avoidance system also transmits, for the attention of the crew, an order for an avoidance maneuver in the vertical plane (for example via a display unit) so as to exit the possibility of collision situation: such an avoidance maneuver order is generally called 'resolution advisory' or 'RA alert'. The TA and RA alerts are generally embodied as voice messages (via the alert unit) and as displays of information (via a display unit) in the cockpit. In practice, the on-board collision avoidance system generally calculates a collision time in the horizontal plane (relationship between the horizontal distance of the two aircraft and their relative horizontal speed) and a collision time in the vertical plane (relationship between the vertical distance of the two aircraft and their relative vertical speed). The collision times that are thus calculated are compared with predetermined thresholds for the TA alerts and for the RA alerts (the predetermined thresholds moreover being dependent on the altitude), and the alerts are triggered when the collision times that are calculated are shorter than the corresponding predetermined thresholds.

The collision avoidance system 8 of the leading aircraft AC1 transmits information externally, in the form of electromagnetic waves (as illustrated by an arrow 9 in FIG. 1), which are able to be detected by a suitable reception device, such as a transponder 10, which is installed on the following aircraft AC2.

The transponder 10, which forms part of the device 1, transmits the information received from the collision avoidance system 8 to the data reception unit 2A via a link 11.

Thus, in this first embodiment, even in the event of failure of the collision avoidance system of the following aircraft, the latter is warned of the risk of collision by the item of information received from the leading aircraft AC1. Therefore, in addition to allowing the following aircraft AC2 to be brought into the safety position PS, it is possible, with this first embodiment, to detect a failure of the collision avoidance system of the following aircraft AC2.

Furthermore, in a second embodiment (shown in FIG. 2), the data reception unit 2B is configured to receive (via a link 13) an item of risk of collision information generated by a collision avoidance system 12 of the following aircraft AC2. This collision avoidance system 12 is preferably similar to the collision avoidance system 8, as described above, of the leading aircraft AC1.

In this second embodiment, the device 1 only takes into account the risk of collision, detected on the following aircraft AC2, between the following aircraft AC2 and the leading aircraft AC1.

Moreover, in a third preferred embodiment, as illustrated in FIG. 1 (comprising both the elements shown in an unbroken line and those shown in dashed lines), the device 1 includes all of the elements of the abovementioned first and second embodiments.

In this third embodiment, the device 1, in order to control the path of the following aircraft AC2, may take into account both the items of risk of collision information transmitted by the collision avoidance system 8 of the leading aircraft AC1 and those transmitted by the collision avoidance system 12 of the following aircraft AC2.

In the context of the disclosure herein, the item of risk of collision information preferably corresponds to a 'resolution advisory' or 'IRA alert' avoidance maneuver order. However, it may also be:

a 'traffic advisory' or 'TA alert' alert; or any item of information warning of a risk of collision and/or of an avoidance maneuver.

Moreover, in one particular embodiment, the calculating unit 3 is configured to determine, as safety position PS, a position that is spaced apart at least laterally (along the Y-axis) by a distance $\Delta Y$ with respect to the current position PO. The aim is to space the following aircraft AC2 apart from an anticipated path TA of the leading aircraft AC1, which path will be followed by the leading aircraft during an avoidance maneuver illustrated by an arrow C in FIG. 3. The safety position PS is preferably a position that is also spaced apart vertically (along the Z-axis) by a distance $\Delta Z$ with respect to the current position PO, as shown in FIG. 3.

The safety position PS is laterally distant enough from the flight path TA and from the vortices V1 and V2 (typically by at least 200 metres) that the following aircraft AC2 does not feel any effect of the closest vortex V1. To define this safety position PS, use may be made of ADS-B data, measured data, etc., which are supplied to a vortex transport model. The vortex transport model depends (as is conventional) on features of the leading aircraft AC1 (mass, wingspan, etc.) and on features of the flight point (speed of the following aircraft AC2, wind, etc.). The position of the safety position PS is directly dependent on the accuracy of the model and of its input data.

In the safety position PS, the following aircraft AC2 may or may not continue to fly in formation (and therefore be responsible for its separation from the leading aircraft AC1), depending on the embodiment that is contemplated.

Thus, in a first embodiment, the control unit 5 is configured, by bringing the following aircraft AC2 into the safety position PS when a risk of collision is detected, to maintain the formation flight between the following aircraft AC2 and the leading aircraft AC1 during this maneuver of the following aircraft AC2.

The device 1 thus enables the following aircraft AC2, on which it is installed, still to retain the advantages, in particular in terms of cost, of flying in formation.

Furthermore, in a second embodiment, the control unit 5 is configured, by bringing the following aircraft AC2 into the safety position PS, to break the formation flight between the following aircraft AC2 and the leading aircraft AC1 during this maneuver of the following aircraft AC2.

Moreover, in one preferred mode of implementation (which may be applied in a manner adjusted to each of the abovementioned embodiments), the device 1 is configured, during the formation flight, prior to the reception of an item of risk of collision information and for as long as no item of risk of collision information has been received, to bring (if necessary) and keep the following aircraft AC2 in what is termed an optimum position PO, in particular using the control unit 5. In this optimum position PO, the following aircraft AC2 flying in formation F benefits from effects of at least one V1 of the vortices V1, V2 generated by the leading aircraft AC1.

This optimum position PO is determined, as is conventional, by a position determination element (not shown) of the central processing unit 7.

In this case, as shown in FIG. 3, the leading aircraft AC1 follows a flight path TV, and it primarily generates two vortices V1 and V2 in its wake, namely a vortex V1 and V2 starting from each of its wings AL1 and AL2 on account of the pressure difference between the lower surface and the upper surface of each wing, and of the downward deflection of the air flow that results therefrom. These vortices V1 and V2 are counter-rotating vortices and are characterized by a wind field that rises overall outside of the vortices and that falls overall between the vortices. Starting from the wings AL1 and AL2, the vortices V1 and V2 tend first of all to move closer to one another, and then to keep a more or less constant distance from one another while at the same time losing altitude with respect to the altitude at which they were generated, as shown in FIG. 3 by a double-headed arrow H. On account of this configuration of the vortices, it is beneficial, for the following aircraft AC2 that is following the leading aircraft AC1 generating the vortices, to be able to exploit the updraughts so as to reduce its fuel consumption, and therefore to bring the following aircraft AC2 to the optimum position PO.

This optimum position PO is such that:
- the following aircraft AC2 is able to be piloted;
- it does not interfere with the systems, the structure and the engines of the following aircraft AC2;
- it does not generate discomfort for the passengers of the following aircraft AC2; and
- it affords benefits, in particular in terms of fuel consumption, for the following aircraft AC2.

Figure 4:
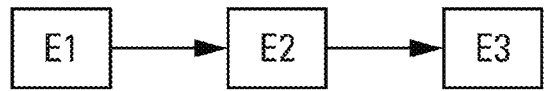
FIG. 4 schematically illustrates a method for controlling the path of the following aircraft, implemented by a control device.

The device 1, as described above, which is on board the following aircraft AC2 (FIG. 3), implements, in the event of a risk of collision, during a formation flight F, the sequence of following steps, comprising, as shown in FIG. 4:
- a reception step E1, implemented by the data reception unit 2A or the data reception unit 2B, comprising or consisting of receiving an item of risk of collision information relating to the leading aircraft AC1, which item of information is generated either by the collision avoidance system 8 of the leading aircraft AC1 or by the collision avoidance system 12 of the following aircraft AC2;
- a calculation step E2, implemented by the calculating unit 3, comprising or consisting of determining a safety position PS when such an item of risk of collision information is received, the safety position PS corresponding to a position in which the following aircraft AC2 is not subjected to effects of vortices V1, V2 generated by the leading aircraft AC1 during an avoidance maneuver; and
- a control step E3 implemented by the control unit 5, comprising or consisting of bringing and in keeping the following aircraft AC2 in the safety position PS, as soon as this safety position PS is determined.

Therefore, during the formation flight, the following aircraft AC2 is kept in an appropriate position with respect to the leading aircraft AC1, and preferably in the optimum position PO where it benefits both from the formation flight and from the positive effects of the vortex V1.

When a risk of collision is detected by the collision avoidance system 8 of the leading aircraft AC1, the leading aircraft AC1 undertakes the avoidance maneuver and the following aircraft AC2 is brought swiftly, using the control unit 5, into the safety position PS (determined by the calculating unit 3), as illustrated by an arrow B in FIG. 3, with or without breakage of the formation flight, depending on the embodiment that is contemplated.

The same applies if the risk of collision is detected by the collision avoidance system 12 of the following aircraft AC2.

Additionally, if the risk of collision exists with the following aircraft AC2, and if the collision avoidance system 12 of the following aircraft AC2 has not detected this risk, the device 1 makes it possible to detect an inconsistency between the two collision avoidance systems 8 and 12 and, where applicable, a malfunctioning of the collision avoidance system 12 of the following aircraft AC2.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling a path of a following aircraft, with respect to a leading aircraft in front of the following aircraft, in an event of a risk of collision, the leading and following aircraft flying in formation, the method comprising a sequence of steps, implemented on the following aircraft and comprising at least:
    a reception step, implemented by a data reception unit and comprising receiving at least one item of risk of collision information relating to the leading aircraft;
    a calculation step, implemented by a calculating unit and comprising determining at least one safety position when an item of risk of collision information is received, the safety position corresponding to a position in which the following aircraft is not subjected to effects of vortices generated by the leading aircraft; and a control step implemented by a control unit and comprising bringing the following aircraft into the safety position as soon as the safety position is determined.

2. The method according to claim 1, wherein the reception step comprises receiving an item of risk of collision information coming from a collision avoidance system of the leading aircraft.

3. The method according to claim 1, herein the reception step comprises receiving an item of risk of collision information coming from a collision avoidance system of the following aircraft.

4. The method according to claim 1, wherein the calculation step comprises determining, as safety position, a position spaced apart at least laterally with respect to at least one anticipated path, followed by the leading aircraft during an avoidance maneuver and to eliminate the risk of collision, in which safety position the following aircraft is not subjected to effects of vortices generated by the leading aircraft.

5. The method according to claim 4, wherein the first calculation step comprises determining, as safety position, a position that is also spaced apart vertically with respect to the anticipated path of the leading aircraft.

6. The method according to claim 1, wherein, prior to reception of an item of risk of collision information, the control step comprises keeping the following aircraft in an optimum position in which the following aircraft flying in formation benefits from effects of at least one of the vortices generated by the leading aircraft.

7. The method according to claim 1, wherein the control step comprises, by bringing the following aircraft into the safety position, maintaining the formation flight.

8. The method according to claim 1, wherein the control step comprises, by bringing the following aircraft into the safety position, breaking the formation flight.

9. A device for cant oiling a path of a following aircraft, with respect to a leading aircraft in front of the following aircraft, in an event of a risk of collision, the leading and following aircraft flying in formation, the device comprising, installed on the following aircraft:

a data reception unit configured to receive at least one item of risk of collision information relating to the leading aircraft;

a calculating unit configured to determine at least one safety position when an item of risk of collision information is received, the safety position corresponding to a position in which the following aircraft is not subjected to effects of vortices generated by the leading aircraft; and a control unit configured to bring the following aircraft into the safety position as soon as the calculating unit has determined the safety position.

10. The device according to claim 9, wherein the data reception unit is configured to receive an item of risk of collision information coming from a collision avoidance system of the leading aircraft.

11. The device according to claim 9, wherein the data reception unit is configured to receive an item of risk of collision information coming from a collision avoidance system of the following aircraft.

12. The device according to claim 11, comprising the collision avoidance system of the following aircraft.

13. An aircraft comprising a device for controlling a path of a following aircraft, with respect to a leading aircraft in front of the following aircraft, in an event of a risk of collision, the leading and following aircraft flying in formation, the device comprising, installed on the following aircraft:

a data reception unit configured to receive at least one item of risk of collision information relating to the leading aircraft;

a calculating unit configured to determine at least one safety position when an item of risk of collision information is received, the safety position corresponding to a position in which the following aircraft is not subjected to effects of vortices generated by the leading aircraft; and a control unit configured to bring the following aircraft into the safety position as soon as the calculating unit has determined the safety position.

* * * * *